United States Patent [19]

Smith

[11] Patent Number: 4,713,151
[45] Date of Patent: Dec. 15, 1987

[54] ELECTRODEPOSITION OF LITHIUM
[75] Inventor: David J. Smith, Kingston, Canada
[73] Assignee: Amoco Corporation, Chicago, Ill.
[21] Appl. No.: 925,327
[22] Filed: Oct. 31, 1986
[51] Int. Cl.$^4$ .......................... C25D 3/54; H01M 6/14; H01M 6/16
[52] U.S. Cl. .............................. 204/58.5; 204/59 AM; 429/194; 429/196; 429/198
[58] Field of Search ................... 204/58.5, 50.3, 55 R, 204/242, 59 AM; 429/196–198, 199, 194, 216

[56] References Cited
U.S. PATENT DOCUMENTS

| | | | |
|---|---|---|---|
| 1,826,159 | 10/1931 | Westbrook et al. | 204/50.3 |
| 3,493,433 | 2/1970 | Hoffmann | 429/196 |
| 3,567,515 | 3/1971 | Maricle et al. | 429/197 |
| 3,580,828 | 5/1971 | Reddy | 204/58.5 |
| 3,953,234 | 4/1976 | Hoffmann | 204/58.5 |
| 3,953,302 | 4/1976 | Rao et al. | 204/58.5 |
| 4,014,761 | 3/1977 | Passal | 204/55 R |
| 4,167,458 | 9/1979 | Louzos et al. | 204/58.5 |
| 4,397,921 | 8/1983 | Xenzhek et al. | 429/197 |
| 4,515,875 | 5/1985 | Bowden et al. | 429/196 |

Primary Examiner—John F. Niebling
Assistant Examiner—Ben C. Hsing
Attorney, Agent, or Firm—Richard A. Kretchmer; William H. Magidson; Ralph C. Medhurst

[57] ABSTRACT

Ricinoleic acid triglycerides can be used to reduce dendrite formation during the electrodeposition of lithium from a nonaqueous solution which comprises at least one lithium salt and sulfur dioxide.

20 Claims, No Drawings

ELECTRODEPOSITION OF LITHIUM

BACKGROUND OF THE INVENTION

1. Field of the Invention

This invention relates to an improved method for the electrodeposition of lithium from a nonaqueous solution which comprises a solution of at least one lithium salt in liquid sulfur dioxide. More particularly, it relates to the use of a triglyceride of ricinoleic acid as an additive for such a solution.

2. Description of the Prior Art

A substantial amount of interest has recently been centered on the development of ambient temperature, high energy density, electrochemical cells which are light in weight and capable of providing a higher voltage than conventional cells such as nickel-cadmium and lead-acid systems or alkaline cells having zinc anodes. The high energy density cell systems which are currently of interest typically involve the use of active metals (metals above hydrogen in the electromotive series of elements which are unstable in an aqueous environment) as anodes in combination with nonaqueous electrolytes. As used herein, "nonaqueous" is intended to mean substantially free of water. Lithium has been of particular interest as an active metal for such high energy density cells since it is the most active of the metals in the electromotive series and has the ability in an electrochemical cell to provide the highest performance in watt-hours per kilogram of all known active metals.

In conventional electrochemical cells, cathode depolarizers are used in a form which will permit an intimate and maximum contact with an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as nickel, graphite or carbon rod, which serves as a current collector or cathode. The physical separation of the cathode depolarizer from the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 3,567,515 issued to Maricle et al. on Mar. 2, 1971, discloses the use of sulfur dioxide as a cathode depolarizer in such a cell in combination with a lithium anode.

During the charging of a rechargeable lithium-sulfur dioxide electrochemical cell, lithium cations in the electrolyte are reduced at the lithium electrode and are electrodeposited onto the electrode as lithium metal. Ideally, the electrodeposited lithium is laid down as a smooth layer over the entire electrode surface, thereby preserving the electrode surface morphology from one discharge-charge cycle to the next. In practice, however, the lithium tends to deposit preferentially at certain sites on the electrode. As a consequence, the morphology of the lithium deposit is such that the electrode surface undergoes modification ranging from moderate roughening to formation of a coating of filaments or dendrites over the entire surface. After several cycles, the electrode can become covered by a dense mat of interwoven dendrites. This type of lithium deposition is undesirable and also hazardous in electrochemical cells because the lithium dendrites are often small enough to penetrate the microporous materials that are conventionally used to separate the lithium anode from the cathode current collector. As a consequence, the dendrites can grow through the separator material and cause a short-circuit between the electrodes, resulting in cell failure and possible explosion. Dendrite growth around the edges of the separator material can also occur with similar results.

The electrodeposition of lithium from a nonaqueous solution which comprises a solution of at least one lithium salt in liquid sulfur dioxide is disclosed, for example, in U.S. Pat. Nos. 3,493,433 (Feb. 3, 1970) and 3,953,234 (Apr. 27, 1976), both issued to Hoffmann.

U.S. Pat. No. 3,953,302, issued to Rao et al. on Apr. 27, 1976, discloses a method for suppressing dendrite formation during the electrodeposition of lithium from a nonaqueous solution which, if desired, can contain sulfur dioxide. This method involves incorporating into the solution an additive which contains a metallic element that is capable of coplating with lithium.

U.S. Pat. No. 1,826,159, issued to Westbrook on Oct. 6, 1931, discloses that an improved cadmium deposit can be obtained from a cadmium-cyanide electroplating bath through the use of sulfonated castor oil as an additive. Similarly, U.S. Pat. No. 4,014,761, issued to Passal on Mar. 29, 1977, discloses the use of sulfonated castor oil as a component of an aqueous electroplating bath for the electrodeposition of zinc. However, neither of these patents suggests the use of chemically unmodified castor oil as a component of a nonaqueous electroplating bath for the electrodeposition of lithium.

SUMMARY OF THE INVENTION

The present invention is directed to the discovery that a triglyceride of ricinoleic acid can be utilized as an additive to reduce dendrite formation during the electrodeposition of lithium from a nonaqueous solution which comprises at least one dissolved lithium salt and sulfur dioxide.

One embodiment of the invention is a nonaqueous conductive liquid which comprises a solution of at least one lithium salt and at least one triglyceride in liquid sulfur dioxide, wherein at least one of the three fatty acid residues of said triglyceride is that of ricinoleic acid.

Another embodiment of the invention is an electrochemical cell comprising in combination: (a) an anode which is comprised of lithium; (b) a cathode; and (c) a nonaqueous conductive liquid electrolyte which comprises a cathode depolarizer, at least one dissolved lithium salt and a minor amount of at least one triglyceride, wherein said cathode depolarizer is sulfur dioxide and at least one of the three fatty acid residues of said triglyceride is that of ricinoleic acid.

A further embodiment of the invention is a process for electrodepositing lithium comprising electrolyzing a nonaqueous solution which comprises at least one lithium salt and a minor amount of at least one triglyceride dissolved in liquid sulfur dioxide, wherein at least one of the three fatty acid residues of said triglyceride is that of ricinoleic acid.

An object of the invention is to provide an improved lithium-sulfur dioxide electrochemical cell.

Another object is to provide an improved electrolyte for use in lithium-sulfur dioxide cells.

Another object of the invention is to provide an electrolyte additive for rechargeable lithium-sulfur dioxide electrochemical cells which will suppress the formation of dendrites on the lithium electrode during charge.

A still further object of the invention is to provide a new process for the electrodeposition of lithium.

DETAILED DESCRIPTION OF THE INVENTION

I have found that a minor amount of a ricinoleic acid triglyceride can be utilized as an additive to reduce dendrite formation during the electrodeposition of lithium from a nonaqueous solution which contains at least one dissolved lithium salt and sulfur dioxide.

Triglycerides (V) are fatty acid esters of glycerol which are conceptually derived by reaction of glycerol (I) with three equivalents of one or more fatty acids (II, III and IV) in the following manner:

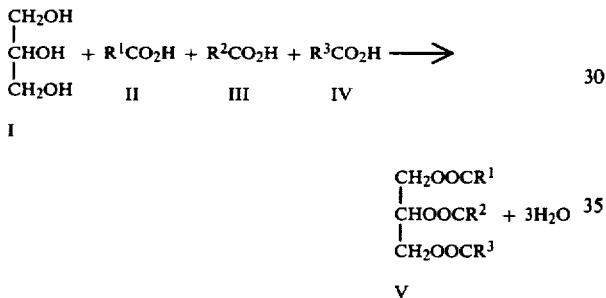

For the purposes hereof, $R^1$, $R^2$ and $R^3$ are referred to as fatty acid residues.

A fatty acid is a monocarboxylic acid which can be obtained from an animal or vegetable fat or oil by hydrolysis. All fatty acids are open-chain aliphatic compounds which contain from 4 to 22 carbon atoms and are characterized by a terminal carboxyl group ($-CO_2H$). Fatty acids can be either saturated or unsaturated. Typical saturated fatty acids include, but are not limited to, butyric ($C_4$), lauric ($C_{12}$), palmitic ($C_{16}$) and stearic ($C_{18}$). Typical unsaturated fatty acids include, but are not limited to, oleic, linoleic and linolenic (all $C_{18}$).

Castor oil, a mixture of triglycerides which is obtained from the seed of the castor bean plant, *Ricinus communis*, contains high concentrations of ricinoleic acid triglycerides. Ricinoleic acid is a relatively uncommon fatty acid of the formula:

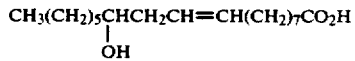

The fatty acid distribution obtained upon hydrolysis of castor oil is typically about 87% ricinoleic, 7% oleic, 3% linoleic, 2% palmitic, 1% stearic and trace amounts of dihydroxystearic.

Suitable triglycerides for use in the practice of this invention are of the general formula V wherein at least one of the three fatty acid residues $R^1$, $R^2$ and $R^3$ is that of ricinoleic acid and is of the formula:

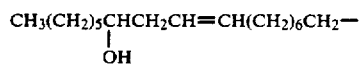

Such triglycerides are herein referred to as ricinoleic acid triglycerides. Preferably, however, at least two of the three triglyceride fatty acid residues are of ricinoleic acid, and more preferably the triglyceride is glycerol triricinoleate wherein all three of the fatty acid residues are of ricinoleic acid. It is particularly convenient to use castor oil which is inexpensive, readily available and, as noted above, contains a high concentration of ricinoleic acid triglycerides.

In the practice of this invention, the ricinoleic acid triglyceride is used in an amount which is effective to improve the smoothness of the lithium deposit which is formed by electrodeposition from a nonaqueous solution which contains at least one dissolved lithium salt and sulfur dioxide. This amount will typically be a minor amount which is in excess of about a 1 millimolar concentration in the solution. Preferred ricinoleic acid triglyceride concentrations range from about 1 to about 10 millimolar. The ricinoleic acid triglyceride can be used in an amount which is in excess of its solubility in the nonaqueous solution, but this embodiment is not usually preferred.

The nonaqueous liquid or electrolyte used in the practice of this invention comprises at least one dissolved lithium salt. This salt provides lithium cations which are reduced to lithium metal during electrodeposition and also serves to improve the conductivity of the electrolyte. In addition, a high lithium cation ($Li^+$) concentration in the electrolyte is highly desirable since this is believed to promote the formation of a passivating film of lithium dithionite on the lithium anode. The lithium cation concentration of the electrolyte is desirably at least about 0.001 molar, preferably at least about 0.01 molar and more preferably at least about 0.1 molar.

Suitable lithium salts for use in the practice of this invention include, but are not limited to, lithium perchlorate, lithium dithionite, lithium sulfate, lithium tetrafluoroborate, lithium hexafluorophosphate, lithium bromide, lithium tetrachloroaluminate and lithium tetrabromide, chlorogallate. Preferred lithium salts include lithium perchlorate, lithium bromide, lithium tetrafluoroborate, lithium hexafluorophosphate, lithium tetrachloroaluminate and lithium tetrachlorogallate.

The anode used in the electrochemical cell of this invention can be constructed from either substantially pure lithium or a lithium alloy. Suitable lithium alloys for this purpose include, but are not limited to, lithium-aluminum, lithium-silicon and lithium-Wood's metal alloys.

The electrolyte for use in the electrochemical cell of this invention comprises sulfur dioxide as the cathode depolarizer which is electrochemically reduced during discharge of the electrochemical cell. This sulfur dioxide also functions as a solvent for the lithium salt and ricinoleic acid triglyceride, which are required in the practice of this invention. In the absence of any surface contamination on the lithium anode which can initiate self-discharge, the cathode depolarizer is stable when in contact with this electrode. Although the reasons for this are not well understood, it is believed that the anode is passivated by the formation of a thin film of lithium dithionite ($Li_2S_2O_4$) which then prevents further sulfur dioxide molecules from reaching the lithium anode surface and thereby prevents self-discharge. Nevertheless, this thin film permits electrochemical oxidation and reduction to take place at the lithium anode during operation of the cell by passage of lithium cations through the film.

The electrolyte for use in the electrochemical cell of this invention can additionally comprise one or more dissolved electrolyte salts other than the required lithium salt. Such additional lithium-free electrolyte salts are ordinarily selected and utilized in amounts which are effective to provide an improved conductivity for efficient operation of the electrochemical cell. Suitable additional electrolyte salts include, but are not limited to, salts containing metal cation complexes, quaternary ammonium salts, phosphonium salts, pyridinium salts and arsonium salts. However, salts containing metal cation complexes are preferred.

Suitable lithium-free electrolyte salts which contain a metal cation complex include, but are not limited to, salts which contain a cation selected from the group consisting of $Mn(2,2'\text{-dipyridyl})_2^{++}$ and $Mn(2,2'\text{-dipyridyl})_3^{++}$.

Preferred quaternary ammonium salts for use as lithium-free electroylte salts are of the formula:

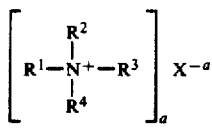

wherein $R^1$, $R^2$, $R^3$ and $R^4$ are independently selected from the group consisting of hydrocarbyl groups containing from 1 to 20 carbon atoms and $X^{-a}$ is selected from the group consisting of perchlorate, tetrafluoroborate, hexafluorophosphate, dithionite, sulfate, phosphate, chloride, bromide, iodide and fluoride. More preferably, $R^1$, $R^2$, $R^3$ and $R^4$ are independently selected from the group consisting of alkyl groups having from 1 to 10 carbon atoms and $X^{-a}$ is selected from the group consisting of perchlorate, tetrafluoroborate, hexafluorophosphate and iodide. Examples of suitable quaternary ammonium salts include tetrabutylammonium perchlorate, tetrahexylammonium perchlorate, tetramethylammonium tetrafluoroborate and tetrapropylammonium hexafluorophosphate.

In addition to sulfur dioxide and at least one lithium salt, the electrolyte for use in the electrochemical cell of this invention can additionally comprise one or more polar organic solvents which is substantially inert to lithium metal and sulfur dioxide. Such organic solvents lack acidic hydrogen atoms and contain one or more atoms having at least one unshared pair of electrons. For the purposes hereof, "acidic hydrogen atoms" are those hydrogen atoms which are capable of being readily abstracted by lithium metal. However, strongly basic solvents such as amines are not generally desirable.

More specifically, suitable polar organic solvents are liquids which contain at least one element which is selected from Groups 3a, 4a, 5a and 6a of the Periodic Table (*Handbook of Chemistry and Physics*, 57th ed., 1976–77, p. B-4). Preferred elements from this group include, for example, boron, silicon, nitrogen, phosphorus, oxygen and sulfur as well as combinations of these elements.

Preferred polar organic solvents for use in the practice of this invention include, but are not limited to, trialkyl borates, boronic acid esters, borinic acid esters, tetraalkyl silicates, alkylalkoxyl silanes, nitroalkanes, alkyl nitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxyethane, 2,2-dimethyoxypropane, ethyl acetate, trimethyl orthoformate, γ-butyrolactone, dimethyl carbonate, ethylene carbonate, tetramethyl orthocarbonate, diethyl ether, tetrahydrofuran, ethylene glycol dimethyl ether, acetic anydride, dimethyl sulfate, dimethyl sulfite, ethylene sulfite and tetramethylene sulfone.

Highly preferred polar organic solvents for use in the practice of this invention include alkyl nitriles, dialkyl amides, lactams, monocarboxylic acid esters, ortho esters, lactones, dialkyl carbonates, alkylene carbonates, orthocarbonates, monoethers and polyethers.

When a polar organic solvent is used as an electrolyte component in the practice of this invention, the electrolyte desirably comprises a mixture of sulfur dioxide and at least one polar organic solvent, wherein the amount of sulfur dioxide is in the range from about 25 to about 99 percent by weight based on the combined weight of polar organic solvent and sulfur dioxide. More preferably, the amount of sulfur dioxide is in the range from about 50 to about 95 percent by weight based on the combined weight of polar organic solvent and sulfur dioxide.

The cathode of the electrochemical cell can be constructed of any material which is electrically conducting and is substantially inert to the electrolyte system. In addition, the cathode material is desirably catalytic with respect to electroreduction of sulfur dioxide, the cathode depolarizer. Preferred materials include metals of the platinum group family consisting of platinum, iridium, osmium, palladium, rhodium and ruthenium; carbon in any of its common electrode forms; iron in its various forms, particularly as stainless steel; and metals from the group consisting of titanium, nickel, silver, mercury, lead and gold. Less preferred materials are metals of the families of vanadium, chromium and manganese [Groups 5b, 6b and 7b of the Period Table of Elements (*Handbook of Chemistry and Physics*, 57th ed., 1976–77, p. B-4)]; metals from the group consisting of zirconium, cobalt, copper, zinc, cadmium, germanium, tin, antimony and bismuth; certain nitrides such as boron nitride; and semiconductors such as silicon. These materials can be used in any of the forms which are conventional in the art, such as rods, compacts, powders, pastes and the like. Highly preferred cathode materials include graphite or carbon bonded to an electrically conducting metal screen.

The following examples are intended only to illustrate the invention and are not to be construed as imposing limitations on it.

EXAMPLE I

A rechargeable lithium-sulfur dioxide electrochemical cell was constructed which contained a lithium anode, a porous carbon cathode current collector and an electrolyte which consisted of a 1.0 molar solution of lithium tetrachlorogallate (LiGaCl$_4$) in liquid sulfur dioxide. The lithium anode was prepared by vapor deposition of a 0.058 cm-thick layer of lithium onto one surface of a glass microscope slide. A portion of the glass-supported lithium deposit was utilized as a lead for the external circuit and this portion was covered with an insulator layer to prevent contact with the electrolyte. The uncovered portion of the lithium deposit served as the lithium anode and had a geometric surface area of about 3 cm$^2$. This procedure resulted in a high-purity lithium electrode which had a very smooth surface when examined under a scanning electron microscope. The cathode current collector was prepared by attaching a mixture of 85 weight percent acetylene black and 15 weight percent Teflon to a metal mesh. The resulting cell was subjected to a series of discharge and charge cycles with 1 percent lithium utilization on discharge (0.5 mA/cm$^2$ on discharge and 0.167 mA/cm$^2$ on charge) until two turnovers of the lithium were achieved. The lithium electrode was then washed with pure liquid sulfur dioxide and examined by scanning electron microscopy. This examination demonstrated that the lithium grain boundaries of the originally smooth lithium surface had been retained, but the resulting surface was very rough with dendrites and particles attached to the surface.

EXAMPLE II

A series of experiments were carried out as described in Example I except that the electrolyte contained small amounts of glycerol triricinoleate. Four such electrolytes were evaluated which had glycerol triricinoleate concentrations of 0.5, 1.0, 3.0 and 6.0 millimolar, respectively. At a 0.5 millimolar concentration, the lithium electrode, after cycling, had a surface morphology which was substantially identical to that observed in Example I. However, at a 1.0 millimolar concentration, the lithium electrode had a smooth nondendritic surface after cycling, and a similar improvement in the surface morphology of the cycled lithium electrode was also observed at glycerol triricinoleate concentrations of 3.0 and 6.0 millimolar.

EXAMPLE III

A minor component (present at a concentration of about 1%) of castor oil was isolated by chromatographic techniques and was found to be a triglyceride which contained two ricinoleic acid residues together with that of an unidentified fatty acid. A series of experiments were carried out as described in Example I except that the electrolyte contained small amounts of this triglyceride. Seven such electrolytes were evaluated which had triglyceride concentrations of 0.35, 0.5, 0.75, 1.0, 1.5, 3.0 and 4.6 millimolar, respectively. With respect to the surface morphology of the cycled lithium electrode, there was substantially no change from that observed in Example I at 0.35 and 0.5 millimolar concentrations of triglyceride. However, a general smoothing out of the surface was observed at the higher triglyceride concentrations. A maximum improvement in the surface morphology of the electrode was observed at a triglyceride concentration of 1.5 millimolar, and further improvement did not occur at the higher concentrations. The 1.5 millimolar and 4.6 millimolar triglyceride concentrations afforded essentially identical nondendridic surface morphologies.

EXAMPLE IV

A series of experiments were carried out as described in Example I except that the electrolyte contained small amounts of glycerol trioleate. Four such electrolytes were evaluated which had triglyceride concentrations of 0.4, 1.0, 1.2 and 4.0 millimolar, respectively. With respect to the surface morphology of the cycled lithium electrode, it was found that the presence of this triglyceride had a negative effect and served to cause increased roughness. Accordingly, not all triglycerides are effective in promoting the nondendritic plating of lithium.

EXAMPLE V

Several rechargeable lithium-sulfur dioxide electrochemical cells were prepared using a 0.2 mm-thick lithium foil anode, a porous carbon cathode current collector and various electrolytes which were prepared by adding small amounts of castor oil to a 1.0 molar solution of lithium tetrachlorogallate (LiGaCl$_4$) in liquid sulfur dioxide. The resulting electrolytes contained castor oil concentrations over the range from 0 to 6 millimolar. The cells were subjected to a series of discharge and charge cycles with 10% lithium utilization on discharge (3.0 mA/cm$^2$ on discharge and 1.0 mA/cm$^2$ on charge) until two turnovers of the lithium were achieved. The lithium electrodes were then washed with liquid sulfur dioxide and examined by scanning electron microscopy. There was very little difference in the surface morphology of the cycled lithium electrode at castor oil concentrations over the range from 0 to 1 millimolar. However, at higher concentrations, a smoother and substantially nondendritic surface was obtained. A castor oil concentration of about 3 or 4 millimolar appeared to be optimum with larger amounts affording no significant further improvement of the surface morphology.

EXAMPLE VI

Three rechargeable lithium-sulfur dioxide cells were constructed utilizing a lithium foil anode, a porous carbon cathode current collector, and three electrolytes which were prepared by adding three different amounts of castor oil to a sulfur dioxide solution which was 1.0 molar in tetrabutylammonium perchlorate and saturated (0.035 molar) in lithium perchlorate. These electrolytes contained castor oil concentrations of 0.68, 1.3 and 2.7 millimolar, respectively. The resulting cells were subjected to a series of discharge and charge cycles with 10% lithium utilization on discharge (1.0 mA/cm$^2$ on discharge and 0.33 mA/cm$^2$ on charge) until 1.5 turnovers of the lithium were achieved. Dendrites were found on each of the resulting cycled lithium electrodes, but the largest dendrites formed in the electrolyte which contained the smallest amount of castor oil.

I claim:

1. A nonaqueous conductive liquid which comprises a solution of at least one lithium salt and at least one triglyceride in liquid sulfur dioxide, wherein at least one of the three fatty acid residues of said triglyceride is that of ricinoleic acid.

2. A liquid as set forth in claim 1 wherein the solution contains a mixture of triglycerides and said mixture is castor oil.

3. A liquid as set forth in claim 1 wherein said triglyceride is glycerol triricinoleate.

4. A liquid as set forth in claim 1 wherein at least two of the three fatty acid residues of said triglyceride are of ricinoleic acid.

5. A liquid as set forth in claim 1 which additionally comprises an organic solvent which is substantially inert to lithium metal and sulfur dioxide.

6. A liquid as set forth in claim 1 which additionally comprises at least one lithium-free salt which is selected from the group consisting of salts containing metal cation complexes, quaternary ammonium salts, phosphonium salts, pyridinium salts and arsonium salts.

7. A liquid as set forth in claim 1 wherein the concentration of said triglyceride is effective to improve the smoothness of the lithium deposit which is formed by electrodeposition from the liquid.

8. A liquid as set forth in claim 1 wherein the lithium salt is selected from the group consisting of lithium perchlorate, lithium dithionite, lithium sulfate, lithium tetrafluoroborate, lithium hexafluorophosphate, lithium bromide, lithium tetrachloroaluminate and lithium tetrachlorogallate.

9. An electrochemical cell comprising in combination:
   (a) an anode which is comprised of lithium;
   (b) a cathode; and
   (c) a nonaqueous conductive liquid electrolyte which comprises a cathode depolarizer, at least one dissolved lithium salt and a minor amount of at least one triglyceride, wherein said cathode depolarizer is sulfur dioxide and at least one of the three fatty acid residues of said triglyceride is that of ricinoleic acid.

10. A cell as set forth in claim 9 wherein the amount of triglyceride is effective to improve the smoothness of the lithium deposit which is formed at the anode during charge.

11. A cell as set forth in claim 9 wherein the electrolyte contains a mixture of triglycerides and said mixture is castor oil.

12. A cell as set forth in claim 9 wherein said triglyceride is glycerol triricinoleate.

13. A cell as set forth in claim 9 wherein at least two of the three fatty acid residues of said triglyceride are of ricinoleic acid.

14. A cell as set forth in claim 9 wherein said electrolyte additionally comprises an organic solvent which is substantially inert to lithium metal and sulfur dioxide.

15. A cell as set forth in claim 9 wherein said electrolyte additionally comprises at least one lithium-free salt which is selected from the group consisting of salts containing metal cation complexes, quarternary ammonium salts, phosphonium salts, pyridinium salts and arsonium salts.

16. A cell as set forth in claim 9 wherein said lithium salt is selected from the group consisting of lithium perchlorate, lithium dithionite, lithium sulfate, lithium tetrafluoroborate, lithium hexafluorophosphate, lithium bromide, lithium tetrachloroaluminate and lithium tetrachlorogallate.

17. A process for electrodepositing lithium comprising electrolyzing a nonaqueous solution which comprises at least one lithium salt and a minor amount of at least one triglyceride dissolved in liquid sulfur dioxide, wherein at least one of the three fatty acid residues of said triglyceride is that of ricinoleic acid.

18. A process as set forth in claim 17 wherein the solution contains a mixture of triglycerides and said mixture is castor oil.

19. A process as set forth in claim 17 wherein said triglyceride is glycerol triricinoleate.

20. A process as set forth in claim 17 wherein the solution additionally comprises an organic solvent which is substantially inert to lithium metal and sulfur dioxide.

* * * * *

UNITED STATES PATENT OFFICE
CERTIFICATE OF CORRECTION

Patent No. 4,713,151                                Dated   December 15, 1987

Inventor(s) David J. Smith

It is certified that error appears in the above-identified patent and that said Letters Patent are hereby corrected as shown below:

Column 4, lines 47 & 48, "lithium tetrabromide, chlorogallate" should read --lithium tetrachlorogallate--.

Column 6, line 22, "anydride" should read --anhydride--.

Column 6, line 54, "Period Table" should read --Periodic Table--.

Column 8, line 4, "nondendridic" should read --nondendritic--.

Column 10, line 17, "quarternary" should read --quaternary--.

Signed and Sealed this

Twenty-eighth Day of June, 1988

Attest:

DONALD J. QUIGG

Attesting Officer        Commissioner of Patents and Trademarks